Dec. 15, 1959 S. A. WETTY ET AL 2,916,774
PROCESS FOR MOLDING HOLLOW ARTICLES
Filed Sept. 27, 1954 3 Sheets-Sheet 1
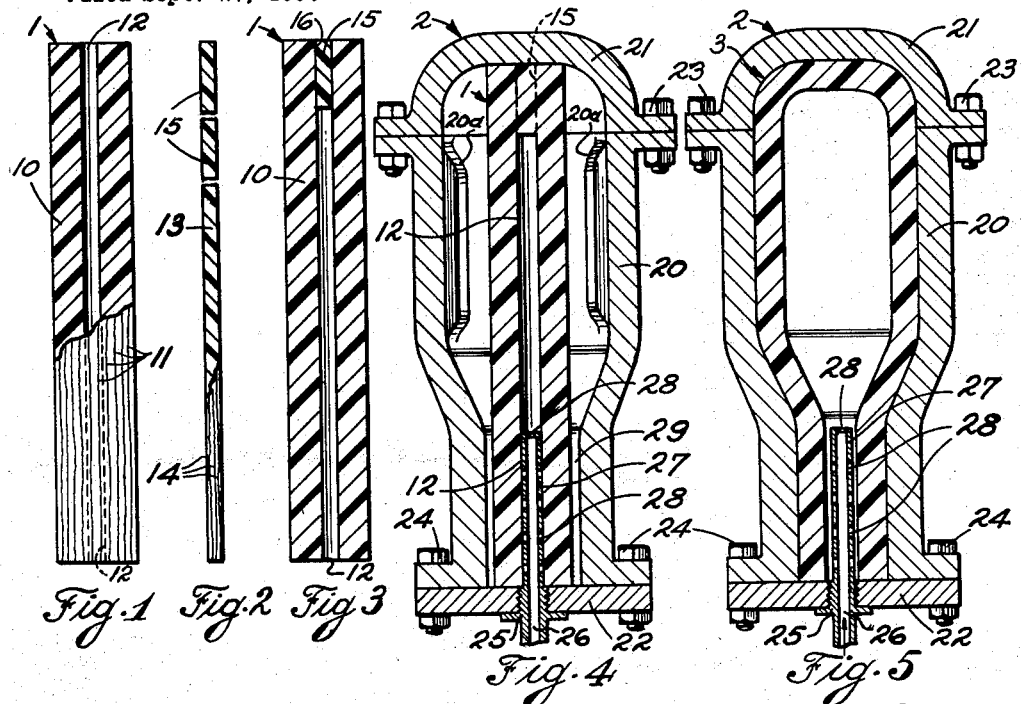
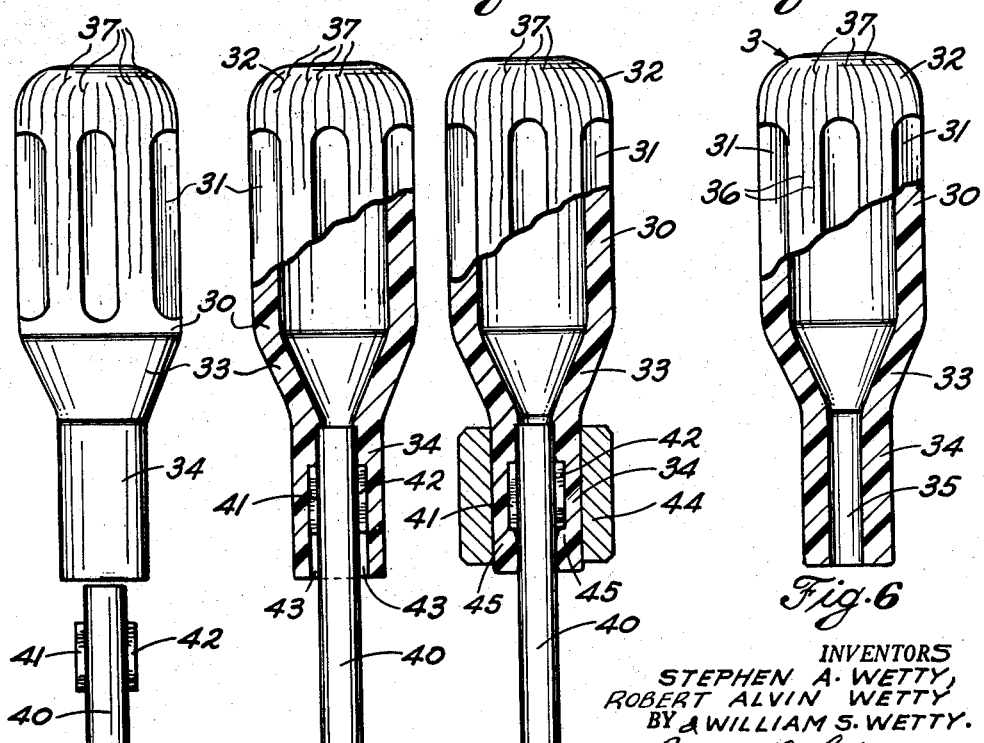
INVENTORS
STEPHEN A. WETTY,
ROBERT ALVIN WETTY
BY WILLIAM S. WETTY.
ATTORNEYS

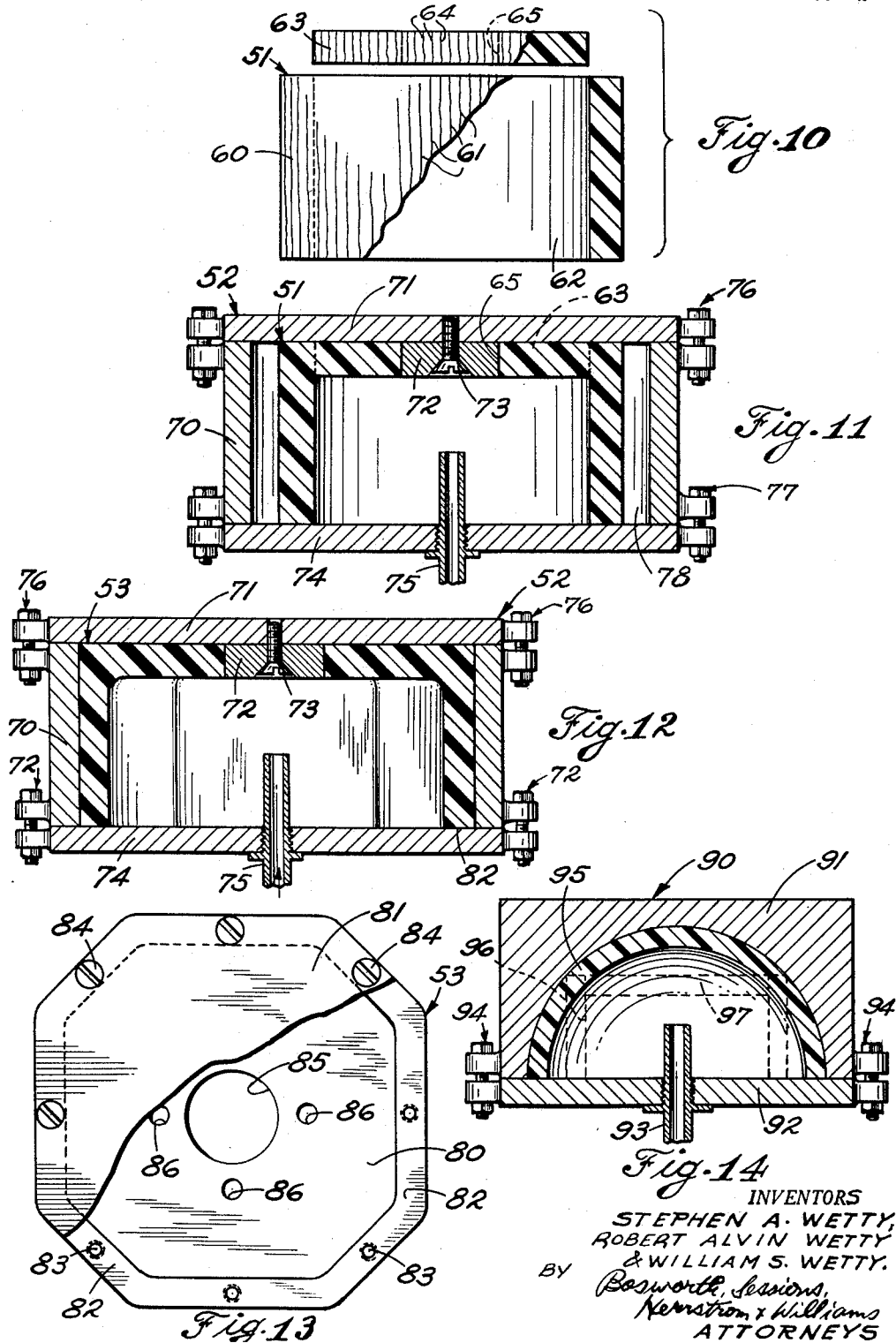

Dec. 15, 1959 S. A. WETTY ET AL 2,916,774
PROCESS FOR MOLDING HOLLOW ARTICLES
Filed Sept. 27, 1954 3 Sheets-Sheet 3

INVENTORS
STEPHEN A. WETTY,
ROBERT ALVIN WETTY
BY & WILLIAM S. WETTY.
ATTORNEYS

United States Patent Office 2,916,774
Patented Dec. 15, 1959

2,916,774

PROCESS FOR MOLDING HOLLOW ARTICLES

Stephen A. Wetty, Robert Alvin Wetty, and William S. Wetty, Royersford, Pa., assignors, by mesne assignments, to S. A. Wetty & Sons, Inc., Royersford, Pa., a corporation of Pennsylvania Application September 27, 1954, Serial No. 458,576

4 Claims. (Cl. 18—47.5)

This invention relates to a process for molding a hollow object having improved physical properties, particularly as regards resistance to impact.

As conventionally done, the molding of thermoplastic synthetic resins results in products in which there is no grain structure or, if there is one, in which the grain has a random orientation. Thus thermoplastic resin products made by casting, compression molding, injection molding and similar methods show little or no grain and no appreciable grain orientation. The physical characteristics of the product, including impact resistance, are likely to be constant from place to place over the surface. While sometimes an advantage, this is not necessarily advantageous in cases in which localized areas of the product are expected to be subjected to particularly hard use and/or abuse.

Thermoplastic synthetic resins that are molded by a process of extrusion frequently show grain orientation in a direction paralleling the direction of extrusion. This results in non-uniformity of the physical characteristics over the surface of the article; for example, a length of rod that has been molded by an extrusion process will give impact resistance values along its sides which are considerably inferior to those obtained by measuring impact resistance on sections taken at right angles to the direction of extrusion. In solid objects such as mallet heads, advantage can be taken of this phenomenon to locate the zones of maximum impact resistance where maximum benefits will be derived from them, as, for example, at the two ends of the mallet head.

In either case, because of the high cost of thermoplastic resins, it is desirable that objects made therefrom be left hollow if it is practicable to leave them hollow. This not infrequently leads to casting, compression molding, transfer molding or injection molding into a longitudinally split mold equipped with an insert designed to provide the desired hollow at the center; however, physical characteristics and particularly impact resistance values of the products may be substantially impaired. Some hollow objects, such as those types of tool handles which have central openings for storing bits and the like, can be made from extruded rod by drilling or otherwise removing part of the material. This is an expensive step the cost of which is not offset by recovery and re-use of the material taken from the center.

In most cases in which a tool handle is being molded, it is therefore preferred to make the tool handle by casting, compression molding, transfer molding, or injection molding, foregoing any central opening.

According to the present invention, hollow objects such as tool handles, junction boxes, balls and the like are molded from pre-formed tubular blanks of extruded thermoplastic resin by expanding the blanks in molds by the application of a pressure fluid such as compressed air introduced while the blanks are in workable condition and then allowing the products thus obtained to rigidify or "set." In the usual case, it is feasible to plug the end of the blank employed in making the work piece, using for that purpose a plug of a thermoplastic resin having characteristics similar to those of the extruded thermoplastic resin of which the blank itself is formed. In this way a work piece is obtained which, molded as hereinafter described, gives a hollow object having at its ends a particularly high degree of resistance to impact.

Other objects and advantages of the invention will be apparent from the description which follows and from the accompanying drawings, in which:

Figure 1 is an elevation of the blank with its upper half broken away to reveal its section;

Figure 2 is a like view of the rod showing parts severed from it for use as plugs;

Figure 3 is a section through the work piece showing the plug in place but not yet fused to the blank;

Figure 4 is a diagrammatic section showing the work piece in position in a suitably shaped mold designed to form it into a tool handle;

Figure 5 is a diagrammatic section through the same mold after completion of the step of molding the work piece to form it into a tool handle;

Figure 6 is a section through the molded product, the upper portion thereof being shown in elevation;

Figure 7 is an elevation of the tool handle and the proximate end of the tool shank before the introduction of the shank into the handle;

Figure 8 is a section with the upper portion thereof in elevation showing the tool handle as it appears immediately after the introduction of the tool shank;

Figure 9 is a section with the upper portion thereof in elevation illustrating how the tool handle is pressed onto the tool shank;

Figure 10 is an elevation with part thereof in section showing a blank and an annular plug before the step of consolidating them;

Figure 11 is a diagrammatic section through a suitably shaped mold showing the work piece in position for molding to form it into a junction box;

Figure 12 is a diagrammatic section through the same mold after molding the work piece to form it into a junction box;

Figure 13 is a top plan showing the finished product with the cover partly broken away;

Figure 14 is a diagrammatic section through a suitably shaped mold showing a molded product of hemispherical shape and, in dotted lines, a work piece of a kind from which it can advantageously be molded;

Figure 15:
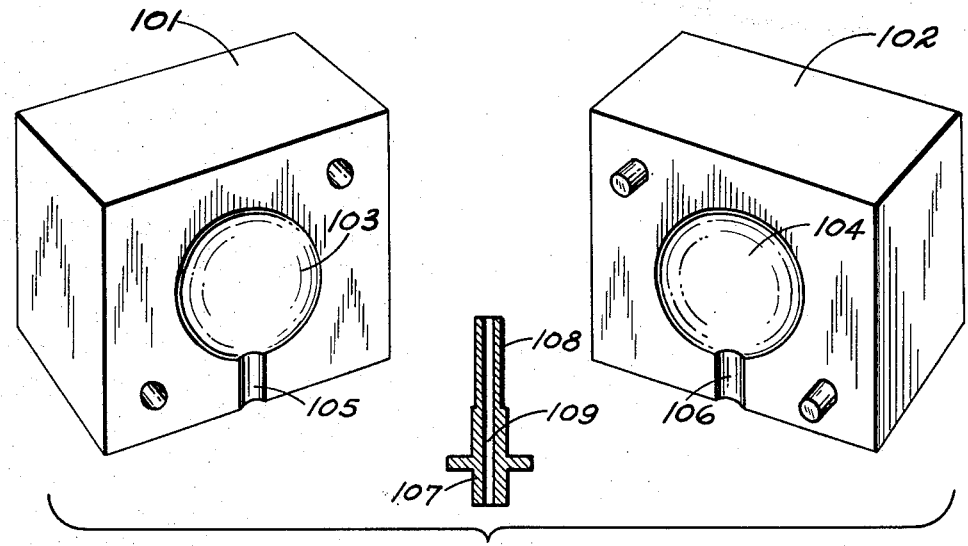
Figure 15 is a diagrammatic perspective showing in exploded fashion the mold parts and blowing nozzle used in forming a spherical object by the practice of the present invention.

In the drawings are illustrated four different ways in which the invention may be practiced. Figures 1 to 6 show how a tubular work piece 1, made up as indicated in Figures 1 to 3, may be formed in a mold 2 (Figures 4 and 5) into the intermediate product 3 shown in Figure 6. As illustrated, such intermediate product takes the form of a handle into which the shank of a tool may later be introduced in the manner shown in Figures 7 to 9. Figures 10 to 13 show how a tubular work piece 51 may be formed in a mold 52 (Figures 11 and 12) into a junction box 53, seen in finished form in Figure 13. Figure 14 shows how the invention may be employed in the manufacture of a hemispherical object. Figures 15 to 19 show how spherical objects may be molded by the practice of the invention.

Figures 1 to 9 have to do with a generally cylindrical object which may be made into a hand-held tool. The work piece 1, shown in three different stages in Figures 1, 3 and 4, is made up by taking a tubular blank 10 of extruded thermoplastic resin, introducing into one end thereof a plug 15 of a compatible thermoplastic resin, preferably a plug rod formed from an extruded rod of cylindrical cross section of the same composition as tubular blank 10, and uniting the two to provide a tubular work piece having one closed end. Such work piece is unitary and, if formed as hereinafter described, is integral for all practical purposes from one end thereof to the other.

In a tubular blank of extruded thermoplastic resin, just as in the case of a rod, there is an invisible grain that is oriented in a direction which in general parallels the longitudinal axis of the blank. As a result, the impact resistance of the blank is much greater at its ends than over the intervening surfaces. In order to illustrate the grain structure in the drawings, grain lines 11 are shown in Figure 1, although it should be understood that the grain structure does not manifest itself by grain lines visible to the unaided eye. The presence of the grain and the direction of its orientation are matters which can be ascertained only by means of microscopes and like test facilities.

For the purposes of the present invention, the grain should preferably run parallel or nearly parallel to the central axis of the blank in the manner diagrammatically indicated by grain lines 11. In order that this state of affairs may obtain, tubing or pipe that has been made by extruding thermoplastic resin is used as the starting material. It is first cut into lengths of suitable size, usually measuring from about 2" to about 8". In the case of the blank 10 shown in Figure 1, the full-size blank measures about 4" in length by about 5/8" in diameter and has a central opening 12 with a diameter of about 1/8".

Where, as in the blank of Figure 1, the opening 12 is small in diameter as compared with the diameter of the blank itself, it is not absolutely necessary that such opening be plugged with an extruded thermoplastic resin of the same or similar composition; instead, a plug of a compatible thermoplastic resin, with or without a demonstrable grain structure, may be used. Preferably, however, the plug is made from a rod such as the cylindrical rod 13 (Figure 2) which is formed by a process of extrusion from the same or substantially the same thermoplastic resin as blank 10. As previously noted, extruded rod usually has a grain oriented in a direction which roughly parallels the longitudinal axis of the rod. This grain structure, which cannot be detected by the unaided eye, is illustrated diagrammatically by means of grain lines 14.

If, as assumed, blank 10 has a central opening 12 measuring about 1/8" in diameter, rod 13 should not exceed 1/8" in diameter and to advantage may be very slightly less, this so as to facilitate its use for plugging. Two plugs 15, each measuring 1/2" or so from end to end, are shown near the top of Figure 2 as they appear when severed from rod 13. In preparing the work piece for molding, a plug 15 from a rod 13 of suitable diameter is introduced into and fixed in place in any convenient way in the upper end of opening 12 in blank 10: see Figure 3. For example, plug 15 may, if desired, be forced into opening 12 and held in place by a friction fit, provided the diameters of opening 12 and plug 15 are so related to each other as to permit it. Ordinarily, however, plug 15 will be cemented in place by means of a thin film of a suitable liquid cement or fused to blank 10 by means of a mutual solvent; i.e., a solvent capable of acting simultaneously on blank 10 and plug 15. The latter method, which constitutes a preferred way of holding plug 15 in place in blank 10, gives a work piece that is virtually integral from end to end. The cement or solvent, as the case may be, is indicated at 16 in Figure 3.

In the preferred form of the invention, in which a mutual solvent is used to cause plug 15 to weld to blank 10, the solvent is applied both to the inside cylindrical surface of blank 10 and to the outside cylindrical surface of plug 15. In such circumstances, there is a certain amount of softening of the respective surfaces before they are brought into contact with each other. This softening continues for a while after plug 15 is inserted in tubular blank 10, but after a few minutes, during which the fusion process takes place, the common solvent evaporates, giving a unitary work piece closed at one end by a plug which can no longer be identified as such, particularly if the end faces of tubular blank 10 and plug 15 are flush with each other. In Figure 4, which shows the work piece in place in mold 2, plug 15 is indicated by dotted lines without any distinctive cross hatching.

As shown in Figure 4, work piece 1 appears to be rigid; however, before work piece 1 is introduced into mold 2 it must be softened until it becomes workable, usually by heating to a temperature between about 200 and about 325 degrees F. Temperatures much in excess thereof, as, for example, a temperature of 400 degrees F., tend to destroy the grain structure in work pieces formed of extruded thermoplastic resins of the types most likely to be used for the purposes of the invention. The heating step, which in practice is done in a continuous furnace, should not be carried beyond the point at which the work piece 1 becomes workable. While in this condition, work piece 1 is introduced into mold 2. If there is a delay in introducing the work piece into the mold, the work piece will tend to set as it loses heat to the surroundings, after which it may no longer be sufficiently workable for the purposes of the invention.

In practice, the mold is likely to be made of two or more mating platens which, fitted together, provide a number of like mold cavities that are interconnected with each other by runners; however, as a matter of convenience in illustrating the invention it is simpler to show the mold as consisting of a body portion 20, a top portion 21, and a bottom portion 22. Top portion 21 is shown as held to body portion 20 by fastening means 23; bottom portion 22 is shown as held to body portion 20 by fastening means 24. In practice, fastening means 23 and 24, where such are required, are likely to take the form of quick-detachable fastening elements such as pivoted tie rods surmounted by wing nuts, the tie rods cooperating in conventional fashion with slots in the flanges on the respective mold portions.

Body portion 20, for the purpose of giving work piece 1 the shape of a tool handle, is characterized by upper and lower cylindrical or substantially cylindrical portions separated by a merging portion of frusto-conical shape. On its inner surface, the upper cylindrical portion is provided with integrally formed ribs 20a. The latter form flutes in the exterior surface of the tool handle. In conformity with conventional molding practice, the upper and lower cylindrical parts of body portion 20 should have a slight upward flare ("draft") to facilitate removal of the product from the body portion of the mold after the molding operation has been completed. Such may or may not be necessary if the mold is split lengthwise on a plane passing through its axis of figure, as is usually the case in plant practice.

Bottom portion 22 is preferably provided with a detachable fitting 25 having therein an opening 26 through which a pressure fluid may be introduced into the mold. Extending into the interior of work piece 1 from the inner end of fitting 25 is an integrally formed nozzle 27 provided with orifices 28 for directing the pressure fluid upwardly into that part of opening 12 lying above the end of nozzle 27 and laterally against the adjacent surfaces in the lower portion of the work piece. Between the lower portion of work piece 1 and the lower cylindrical portion of the mold is a clearance 29, shown in exaggerated fashion in Figure 4. Some clearance will normally be present, but it will ordinarily be less than that shown, this so as to require the work piece to align itself with fitting 25. Clearances elsewhere in the mold normally will be approximately as shown, there being of necessity substantial clearances between mold 2 and work piece 1 where ribs 20a project inwardly into the mold cavity.

Before work piece 1 has had an opportunity to lose so much heat that it is no longer easily workable, compressed air or other pressure fluid is introduced into the lower end of work piece 1 through fitting 25. The pressure fluid so introduced may be at any convenient pressure above about 25 or 30 lbs. per square inch; for example, it may be a pressure of 50 lbs., 100 lbs. or even 1000 lbs. per square inch. Primarily, the introduction of the pressure fluid is for the purpose of expanding work piece 1 into intimate contact with the inside surface of mold 2. At this stage, work piece 1 assumes the shape and proportions of the mold to form intermediate product 3; that is to say, the tool handle being molded (Figure 6).

It is at or near room temperatures, the pressure fluid so introduced into the interior of work piece 1 serves to rigidify or "set" the resin, making it possible to dispense with any separate cooling or quenching step. After this much has been done, which is usually a matter of only a few seconds after the mold parts are closed around the work piece, the product can be withdrawn by opening the mold and ejecting it in any convenient way. At this stage, the product is at a temperature well below that at which the resin softens but nevertheless has a perceptible warmth.

Where, as in Figures 1 to 9, the invention is being used in making a tool handle, the intermediate product has the typical appearance illustrated in Figure 6. The body or upper cylindrical portion 30, which is the portion grasped by the fingers in using the tool, has flutes 31 where ribs 20a projected into the mold cavity. It is surmounted by a dome-like portion 32 conforming generally to the palm of the human hand. Below the upper cylindrical portion 30 is the frusto-conical portion 33; below it, the lower cylindrical portion 34. The latter is of considerably smaller diameter than upper cylindrical portion 30. In it is an elongated opening 35 measuring approximately ¼" in diameter for reception of the shank of the tool. The walls of the tool handle will usually be uniform or nearly uniform in thickness, as shown, although there is no particular disadvantage to non-uniformity so long as there is ample material in the walls to enable the tool handle to stand up in use.

A tool handle such as that shown in Figure 6 may be used for a screw driver, a chisel, an awl or in any similar hand-held tool. Tools of this sort are not infrequently called upon to absorb the shock of a hammer blow on the end of the tool handle. The impact of a hammer blow applied to the end of the ordinary tool handle is often sufficient to split it, if of wood, or to chip or otherwise mar it if it is of a synthetic resin, hard rubber or the like. By contrast, the high impact resistance possessed by blank 10 and rod 13 are retained in the tool handle of the present invention, permitting it to stand up to much better advantage under abuse, as, for example, under a blow by a particularly heavy hammer.

In the case of tool handles formed as indicated in Figures 1 to 5, the original grain in blank 10, which grain is shown at 36 in Figure 6, persists notwithstanding reheating of the extruded thermoplastic resin used in blank 10. Expansion of work piece 1 from the form shown in Figure 3 to that shown in Figure 5 does not greatly change the grain structure except that in rounded portion 32 and also in frusto-conical portion 33 of the tool handle the grain can be shown by microscopic examination to conform to the shape given to the tool handle in the mold. This is indicated in diagrammatic fashion by grain lines 37 in rounded portion 32.

In attaching the tool handle to the tool shank, it is feasible to follow the sequence of steps illustrated in Figures 7 to 9, although some other sequence of the same or different steps may be used if desired. Thus one may take a tool shank 40 provided with ears 41 and 42, such ears being introduced in the process of making the tool shank as by forging or otherwise striking the ears out of the stock of which the tool shank is formed. Preparatory to introducing shank 40 into the tool handle, the latter is re-heated sufficiently to soften lower cylindrical portion 34, after which tool shank 40 is forced endwise into opening 35. This can usually be done without difficulty, either manually or by means of a machine.

If, as is usually the case, opening 35 in lower cylindrical portion 34 is of a diameter slightly smaller than the diameter of tool shank 40, ears 41 and 42 will force their way into the material of the side walls of lower cylindrical portion 34 and the end of tool shank 40 will force any surplus material ahead of it into the cavity in the tool handle, where such surplus material can remain. If, on the other hand, opening 35 is slightly larger than the diameter of tool shank 40, ears 41 and 42 will nevertheless force their way into the material of the side walls of lower cylindrical portion 34. In either case, ears 41 and 42 will leave behind them channel-like openings 43 (Figure 8) which should be closed in some convenient way.

One way of doing this is to press lower cylindrical portion 34 into contact with tool shank 40 while the material of lower cylindrical portion 34 is still workable. In the preferred method of practicing the invention, a split collar 44 is closed around lower cylindrical portion 34 as shown in Figure 9, thus urging lower cylindrical portion 34 into more intimate contact with the tool shank. In the process, part of the material of lower cylindrical portion 34, indicated at 45, flows into the channel-like openings 43 below ears 41 and 42. When the resin rigidifies, this material prevents retraction of the tool handle by interfering with ears 41 and 42. Thus shank 40 is held in place in lower cylindrical portion 34 without freedom to move into or out of the tool handle or even to turn to a different angular position.

In making the tool handle or any comparable hollow object of generally cylindrical shape, it is possible to use almost any of the many available thermoplastic resins that is rigid at ordinary temperatures. Preferred for the purposes of the invention is cellulose acetate butyrate, although cellulose acetate itself can be used for the purpose. So also can cellulose nitrate. Ethyl cellulose, which has a particularly high resistance to impact and which is capable of maintaining its toughness and resilience over a wide temperature range, is likewise suitable. Non-cellulosic resins may be used, among them polystyrene; the polyamides (nylon); the acrylic resins, particularly polymethylmethacrylate; and the various vinyl polymers, including polyvinyl chloride, polyvinyl acetate and the polyvinyl acetals. In the step of fusing together the plug and the tubular blank, there may be used as mutual solvents such common solvents as acetone, methyl ethyl ketone, the various Cellosolves, and many others known to those skilled in the plastics art.

Figures 10 to 13 illustrate how the invention may be employed in forming a box, in this case a junction box for use in electrical wiring. As indicated in Figure 10, it is possible to use as a blank in making up work piece 51 a short section of extruded thermoplastic tubing or pipe, designated 60, in which there is a definite orientation of the grain, indicated by the grain lines 61. The end of blank 60 is plugged much as before, although in forming a junction box by the process of the invention it is convenient to use a plug 63, annular in shape, formed by severing into sections a length of extruded thermoplastic resin pipe or some similar product having a generally tubular contour.

If the plug 63 used in making work piece 51 is annular in shape, the opening 65 therein should be circular and centrally located. In such plug, if made of an extruded thermoplastic resin, there is a grain structure which in Figure 10 is represented by grain lines 64. Annular plug 63 should have an outer diameter that is substantially the same as or slightly less than the inner diameter of blank 60, this so that the two may be fused together in the manner already described.

After having been formed as described, work piece 51 is heated to a convenient temperature at which it is sufficiently workable; i.e., between about 200 and about 325 degrees F., depending in part on the chemical nature of the resin. It is then inserted in mold 52, which is closed around it as shown in Figure 11. Mold 52 consists of a body portion 70, octagonal in shape, on which is a top portion 71 carrying an insert 72 held to top portion 71 by means of a screw 73. Insert 71 is of a size to fit freely into opening 65 in plug 63. Bottom portion 74 of mold 52 is provided with a fitting 75 for admitting compressed air or some other pressure fluid. Work piece 51 is held in proper relation to body portion 70 by insert 72, which serves to center it in place. The several mold parts are held together by fastening elements 76 and 77.

At this stage, there is a clearance 78 between work piece 51 and the side walls of body portion 70 of mold 52; however, soon thereafter, while work piece 51 is still workable, compressed air at room temperatures is admitted through fitting 75. In consequence thereof, the thermoplastic resin in work piece 51, which, as indicated in Figure 11, is virtually an integral product, spreads outwardly into contact with the side walls of body portion 70 of mold 52, giving an intermediate product 53 having the internal appearance shown in Figure 12. Inasmuch as work piece 51 in spreading out assumes the shape of mold 52, the exterior shape of intermediate product 53 is of course octagonal.

Thereafter, intermediate product 53 is removed from the mold and made ready for such subsequent operations as must be performed on it to adapt it to its intended use. As shown in Figure 13, it is provided with a cover 81, formed independently, which is attached to end face 82 of the finished junction box. For this purpose, the side walls of the junction box are first tapped as shown to form screw holes 83. The latter are provided to receive the screws 84 by which cover 81 is held in place. The side walls of the junction box lend themselves to tapping to form screw holes largely because of the fact that the grain runs much as it originally did in work piece 51; i.e., parallel to the central axis of blank 60.

Around the central opening 85 in the bottom of the junction box, which opening corresponds in shape and size to mold insert 72, is a series of smaller openings 86 for receiving the screws by which the junction box is to be held to the wall on which it is to be used. The production of these openings in what was originally plug 63 presents no problem if the plug is formed from an extruded thermoplastic resin in the manner previously described. The side walls of the junction box lend themselves to drilling to form openings for the wires which will ultimately leave the junction box through such side walls.

In making a junction box such as that of Figure 13, the composition may be of any of the kinds previously described, as is true also of the solvents used in attaching plug 63 in the end of blank 60. Although in Figures 10 to 13 the invention has to do mainly with a junction box, it is possible to form in the same manner a wide variety of boxes of other types. Thus a rectangular box, a triangular box or a cylindrical box may be formed in this same way by using appropriately shaped molds and work pieces. Actually, there is no reason why the box to be formed should have a geometrical shape: it may, for example, have an irregular contour the shape of which will be determined by the shape given by the mold maker to the mold cavity.

If desired, a hemispherical product may be formed in an analogous manner. This is illustrated in Figure 14, wherein mold 90 consists of a square top portion 91 having a hemispherical cavity, a flat bottom portion 92 provided with a fitting 93, and conventional fastening elements 94. In such a mold may be formed a generally hemispherical product 95 such as one-half of a play ball, flush tank float, fish net float or anything of the sort. As before, the product is made by taking a work piece (shown in dotted lines) consisting of a tubular blank 96 and a circular plug 97. Two generally hemispherical products formed in a mold of the type illustrated in Figure 14 may be fused or cemented together to give a sphere, spheroid or the like.

An alternative method of forming a sphere is illustrated in Figures 15 to 19. The die used for the purpose is made in two like halves, 101 and 102, which halves are provided with hemispherical cavities 103 and 104, respectively. In communication with hemispherical cavities 103 and 104 are passages 105 and 106, the same being adapted, when brought together, to form a generally cylindrical passage accommodating means for introducing a pressure fluid into the interior of the mold. As indicated in Figure 15, such means comprise a fitting 107 having a nozzle 108 formed integrally therewith. Extending axially through the fitting and nozzle is an orifice 109.

Figure 16:
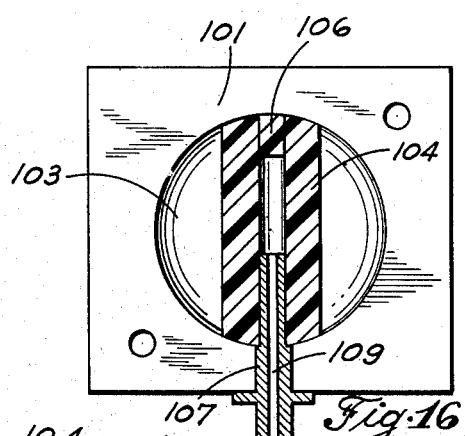
Figure 16 is a corresponding elevation showing one half of the mold with the blowing nozzle and work piece in place.
Figure 17:
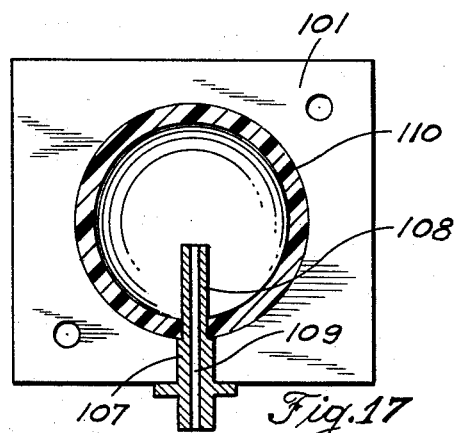
Figure 17 is a corresponding elevation showing one half of the mold with the spherical object in section.

The manner in which fitting 107 co-acts with mold halves 101 and 102 will be apparent from Figure 16, which shows fitting 107 in place in mold half 101. It will be noted that nozzle 108 discharges at a point near the geometrical center of the mold cavity, accordingly, it is not necessary that there be any apertures along its sides, although such apertures may be provided, if desired. Surrounding nozzle 108 is a tubular work piece 104 of a suitable thermoplastic resin having therein an axially extending opening 105 the upper end of which is plugged at 106 by a plug of the same or a similar thermoplastic resin. A work piece of this kind is preferably softened by dry heat, as in a furnace, before being introduced into the mold. It can then be blown by compressed air or other pressure fluid introduced through fitting 107, giving rise to the spherical product 110 appearing in section in Figure 17.

Figure 18:
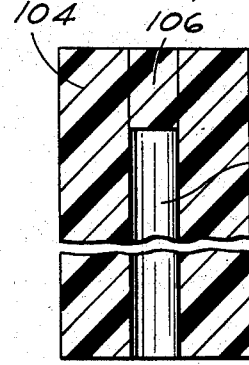
Figures 18 and 19 are sections showing the work piece of Figure 16 before and after rounding off the ends to adapt it to the mold cavity, the scale being twice that of Figure 16.
Figure 19:
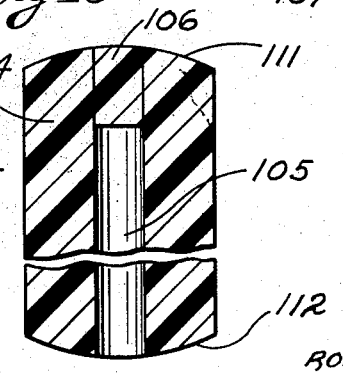

Figures 18 and 19 show the work piece before and after adapting it to conform to the round shape of the mold cavity. In Figure 18 work piece 104 is shown as it appears immediately after plugging in the manner already described; however, a second plug of annular shape (not shown) can be provided, if desired, at the opposite or lower end of opening 105. The work piece may be introduced into the mold in the form shown but its failure to conform at its upper and lower ends to the round shape of the mold cavity tends to make for potential non-uniformity in the wall thickness of the product. It is therefore desirable to round off the upper and lower ends of the work piece as indicated in Figure 19 at 111 and 112, respectively. If this is done, work piece 104 can be centered in the mold in contact with the walls of the mold and, if so, can more readily be blown to give a truly spherical object of substantially uniform wall thickness.

It is evident that where fitting 107 and nozzle 108 extend through the bottom of the mold into the mold cavity there will be a hole in the wall of any spherical object that is formed as described above. This is not objectionable, for after the product has once been ejected from the mold it is a simple matter to fill in the opening with a patch of the same thermoplastic resin that is used in the work piece itself. In certain objects of more or less spherical shape, such as flush tank floats, it is desirable that an opening be provided for receiving the end of a lever arm or the like; in this case, the opening in the product may be tapped to receive the screw-threaded portion at the end of the conventional lever arm. If a finishing operation is considered desirable or necessary after patching or otherwise closing the hole, such can readily be performed and, when done, can usually be relied on to conceal any evidence of what was once an opening in the product.

It is evident that other products than those shown or specifically mentioned may advantageously be made by the process of the invention. Where the object can well be hollow, with consequent saving of weight and material, the invention may frequently be employed in ways that will be apparent to those skilled in the art. Thus the invention finds applicability in the manufacture of statuettes, figurines and placques; in the making of cutlery handles such as handles for carving sets, hunting knives, etc.; and in the molding of door knobs and similar items that need not necesarily be solid throughout. It is evident that in certain of its aspects the invention can be employed also in the manufacture of a variety of open-ended articles such as tumblers, bottles, bowls, housings and similar containers of various shapes and sizes.

It is intended that the patent shall cover, by summarization in appended claims, all features of patentable novelty residing in the invention.

What is claimed is:

1. The process of molding a hollow object having in its finished form a high degree of resistance to impact comprising using as a work piece a preformed tubular blank of extruded thermoplastic resin characterized by a grain paralleling the axis of the work piece; plugging at least one end of the work piece with a separately formed plug of extruded thermoplastic resin of compatible composition, the direction of the grain in the plug paralleling the direction of the grain in the rest of the work piece; heating the work piece until the plugged portions thereof have become workable; introducing the work piece into a mold while the plugged portions of the work piece are still workable; inflating the workable portions of the work piece by means of a pressure fluid to force them into conformity with the mold; and, after the resin in the inflated portions of the work piece has set in place, removing the product from the mold.

2. The process of claim 1 in which the plug is joined to the blank at the outside in such manner as to yield a work piece that for practical purposes is integral from end to end.

3. The process of claim 2 in which the material of the plug is fused to the material of the blank.

4. The process of making a hand-held tool the handle of which has a high degree of resistance to impact comprising taking as a work piece a pre-formed generally cylindrical tubular blank of extruded thermoplastic resin characterized by a grain paralleling the axis of the blank; plugging one end of the work piece with a separately formed plug of extruded thermoplastic resin of compatible composition in which the grain runs in the same direction as in the blank, said plug being of generally cylindrical shape; heating the work piece until it becomes workable; introducing the work piece into a mold while the work piece is still workable; inflating the work piece through the open end thereof to cause the work piece to assume the shape of the mold; removing the work piece from the mold after the resin has set in place; forcing the tool shank into the unplugged end of the work piece; and urging the material of the work piece into contact with the tool shank.

References Cited in the file of this patent

UNITED STATES PATENTS

| | | |
|---|---|---|
| 1,904,290 | Neidich | Apr. 18, 1933 |
| 1,940,223 | Most | Dec. 19, 1933 |
| 2,288,454 | Hobson | June 30, 1942 |
| 2,515,093 | Mills | July 11, 1950 |

OTHER REFERENCES

New Plastic-Metal Assembly Method, "Modern Plastics," December 1943, pp. 110 and 111.